H. Tunison
Horse Rake.
No. 47587
Patented. May. 2. 1865
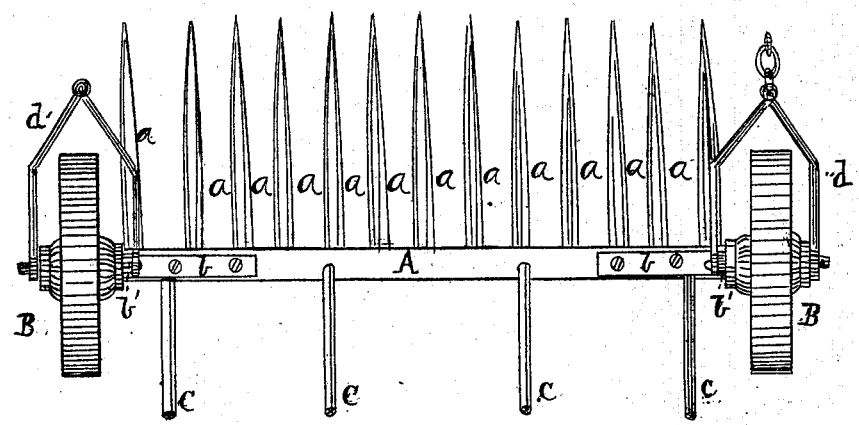
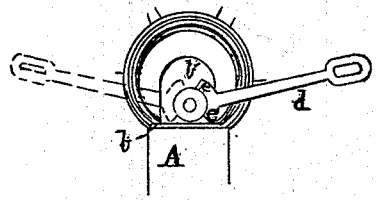
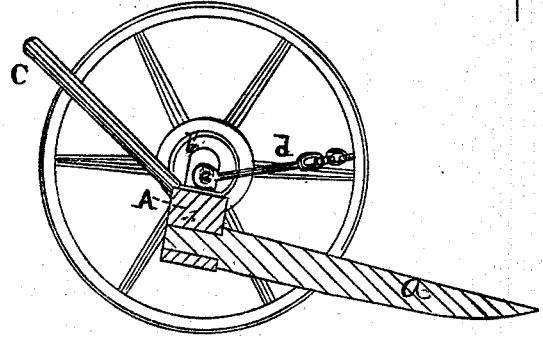
Witnesses,
Clifford Auck
C. P. McKean
Inventor
H. Tunison
By Smith & Dodge
Attorneys

UNITED STATES PATENT OFFICE.

H. TUNISON, OF WHITE HALL GROVE, ILLINOIS.

IMPROVEMENT IN HORSE-RAKES.

Specification forming part of Letters Patent No. 47,587, dated May 2, 1865.

*To all whom it may concern:*

Be it known that I, H. TUNISON, of White Hall Grove, in the county of Greene and State of Illinois, have invented certain new and useful Improvements in Horse Hay-Rakes; and I do hereby declare that the following is a full, clear, and exact description thereof, reference being had to the accompanying drawings, making part of this specification, and to the letters of reference marked thereon, in which—

Figure 1 is a plan view of the machine complete; Fig. 2, a transverse section taken in the line $x\,x$ of Fig. 1; and Fig. 3, a view of a portion of the same enlarged, in order to illustrate more fully its operation.

A represents the main frame of the implement, which may consist of a suitable stick of wood twenty feet in length, more or less. This piece A has framed into it or otherwise securely attached a series of teeth, $a\,a$, &c., which project forward to a distance of six feet, more or less, and are constructed of the form substantially as shown in Fig. 2. A series of handles, $c\,c\,c\,c$, are secured to the rear side of A, as clearly shown in Figs. 1 and 2.

Axles for the wheels B B are attached to each end of A, as shown in Fig. 1. These axles, after passing through the wheels, are bent at a right angle downward, forming the shoulder $b'$, after which they are again bent at a right angle horizontally, forming the strap $b$, by which it is bolted to the frame A, as shown in Fig. 1.

A rod, $d$, is pivoted upon the axles on both sides of each wheel, the rods at each end of the frame forming a pair, and being united a short distance in front of the wheel, as shown in Fig. 1. If desired, these rods may be made in one piece, like a clevis, as there shown. The inside rod of each pair is provided with shoulders $e\,e$, as shown in Figs. 2 and 3. These shoulders rest upon the plate $b$, or on frame A, in the manner shown in Fig. 3, by which the outer end of said rod is held up in the position shown.

To the outer end of the rods $d$ is attached a chain, which extends forward to the front end of the teeth $a$, or beyond, and to this chain is secured a whiffletree for attaching a horse or other animal, there being one at each end of the machine. The rods being pivoted, as shown and described, enables them to be turned over back, as shown in red in Fig. 3, so that the animals can be made to draw the machine either forward or backward without being unhitched or detached therefrom.

The operation is as follows: A horse is hitched to each end of the machine, and a boy is placed on each horse to direct its movements. The machine is then drawn across the field, where the loose hay lies, which it gathers up as it passes along, the hay being carried along with it upon the teeth $a$, it being prevented from falling back off the machine by the handles $c$ as it is piled up thereon. The machine being drawn toward the stack, where it is intended to deposit the hay, becomes loaded as it advances, and if the hay happens not to be in the immediate vicinity of the stack it can thus be readily moved to any desired distance until the stack is reached. When it arrives at the desired point, the horses are turned back, the rods $d$ being reversed, as shown in red in Fig. 3, when a slight movement of the animals serves to withdraw the rake from underneath its load, leaving the hay deposited where it was stopped, after which it can be placed upon the stack in the usual manner.

By this means I am enabled to gather hay in a very rapid and expeditious manner, to dispense entirely with the use of a wagon or similar vehicle for that purpose, and also to save a vast amount of labor usually expended in pitching the hay onto and off the wagon, &c.

Having thus described my invention and its operation, what I claim is—

A horse hay-rake consisting of the body A, provided with the series of teeth $a\,a$, and provided with the reversible rods $d$, or their equivalents, attached separately, as shown, for the purpose of enabling it to be drawn and operated by animals acting independently at each end, substantially as herein shown and described.

HENRY TUNISON.

Witnesses:
   A. F. VEDDER,
   W. N. CARR.